Patented May 18, 1937

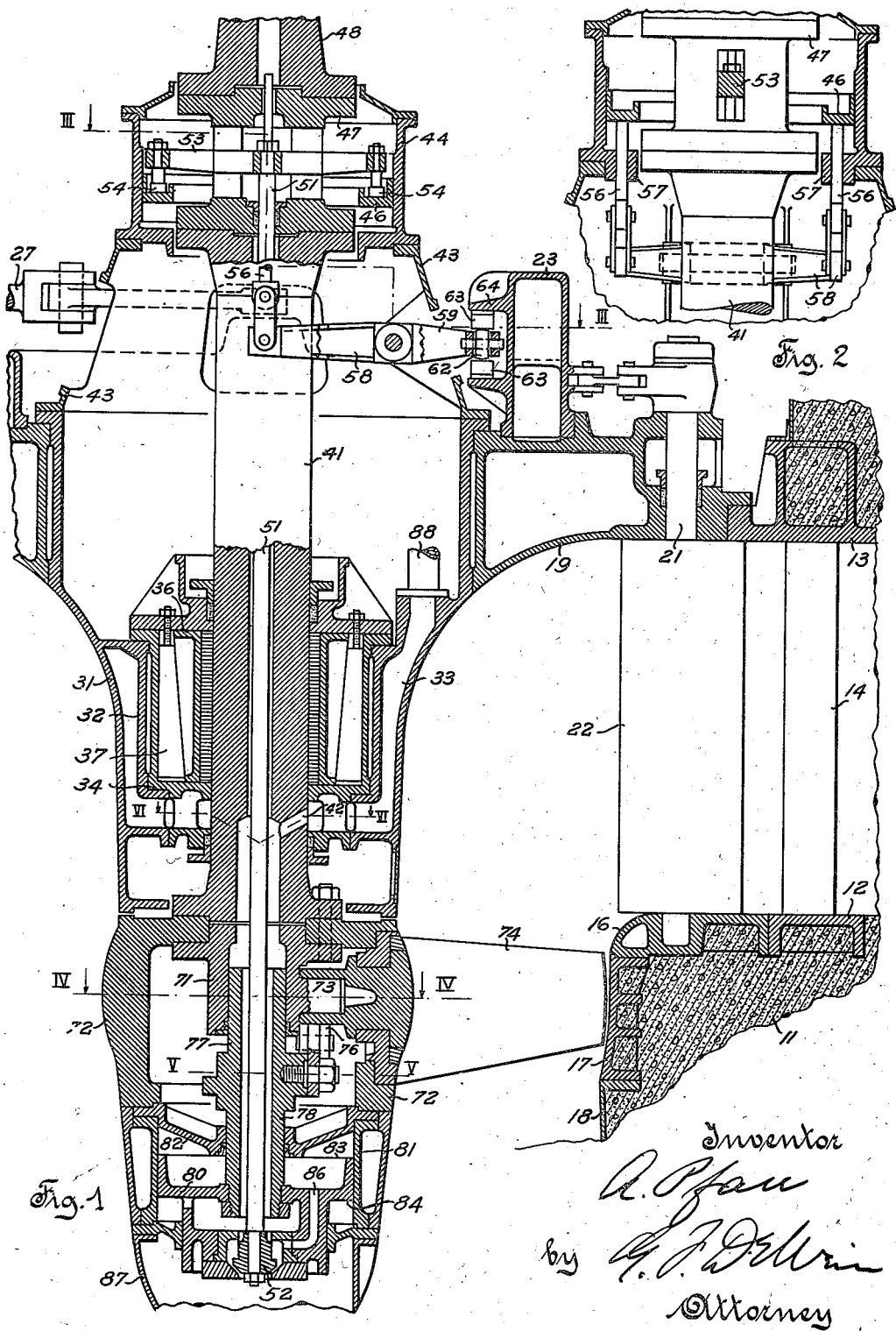

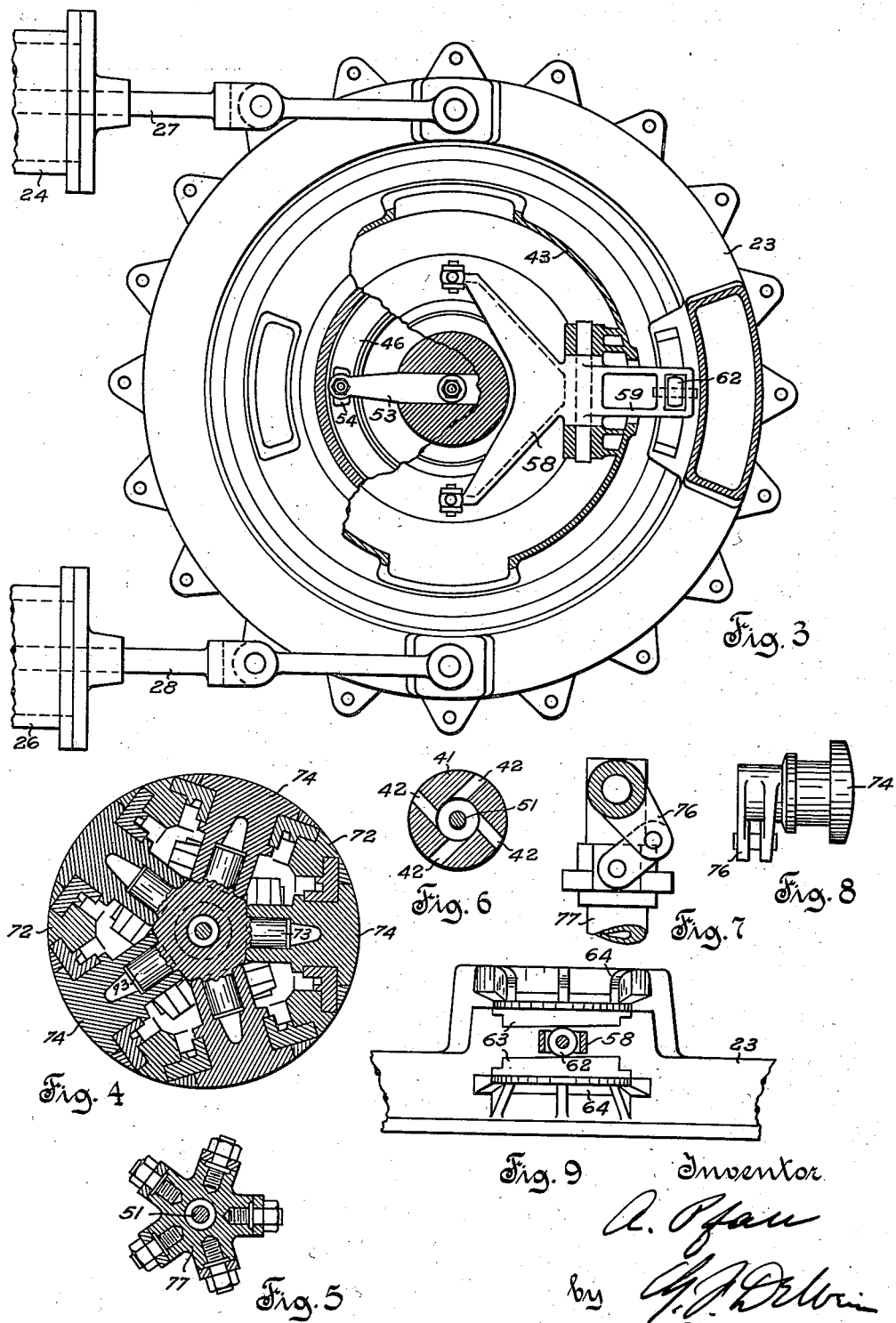

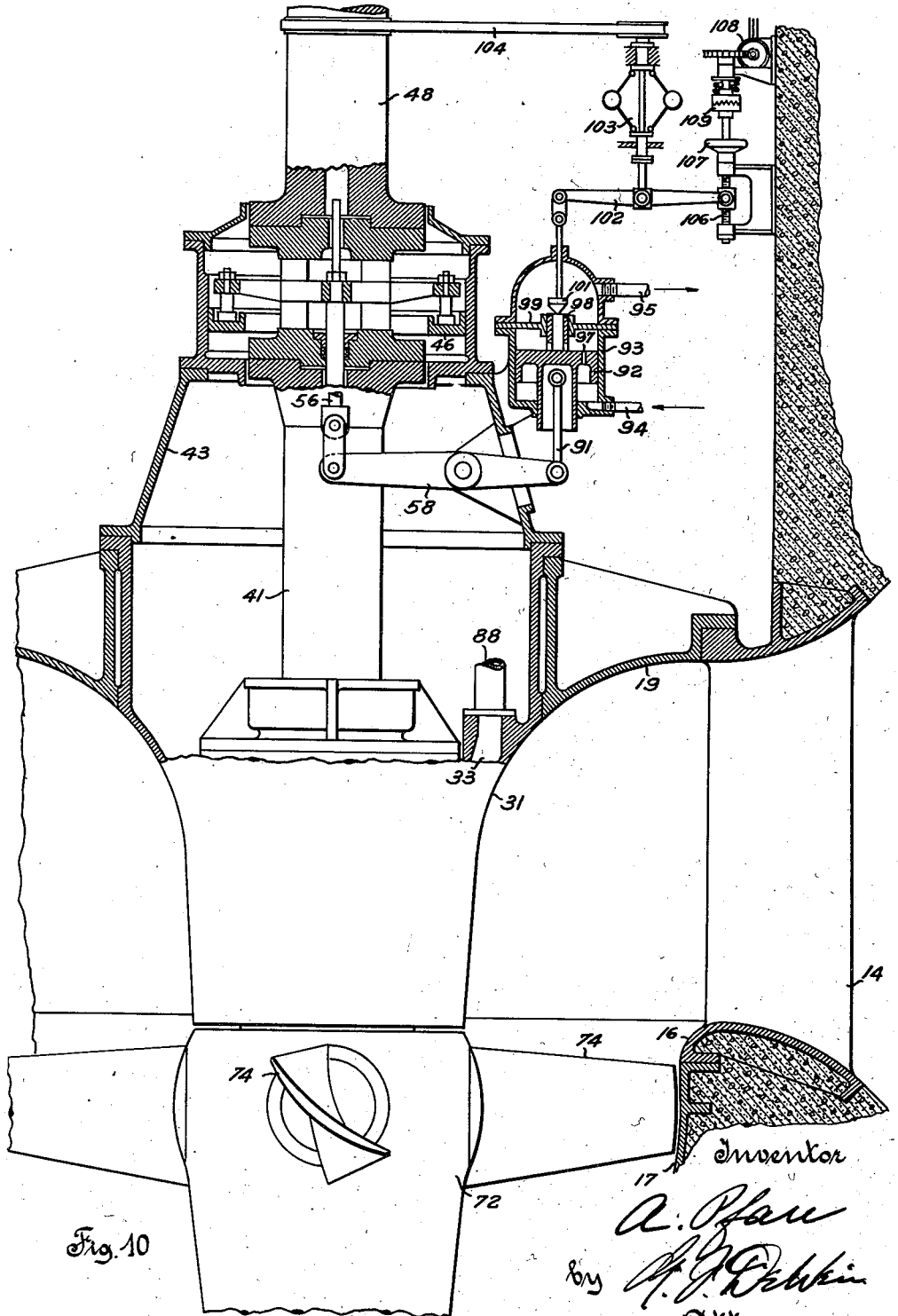

2,080,742

UNITED STATES PATENT OFFICE 2,080,742

PROPELLER BLADE CONTROL

Arnold Pfau, Milwaukee, Wis., assignor to Allis-Chalmers Manufacturing Company, Milwaukee, Wis., a corporation of Delaware Application February 14, 1936, Serial No. 63,918

14 Claims. (Cl. 253—148)

This invention relates to improvements in hydraulic turbines of the adjustable vane runner type and particularly to means for varying the angular adjustment or tilt of such movable runner vane.

To maintain the highest possible efficiency in the operation of hydraulic turbines of the type in which the runner vanes are adjustable under all operating conditions, it is necessary not only to actuate the gate or guide vanes to control the flow of water to the turbine and to vary the tilt of the runner vanes but it is also essential to maintain a predetermined relation between the position of the gate and the runner vanes. If the user of a hydraulic turbine is satisfied with a moderately favorable range of efficiencies rather than the highest possible efficiency, such range can be obtained by movement of the runner vanes only and without corresponding movement of the flow controlling or guide vanes. Adjustment of the runner vanes requires considerable energy particularly when the turbine is in operation and when the vanes are to be adjusted in a direction contrary to the flow of water through the turbine. Such adjustment should be responsive to some operating condition but means responsive to any operating condition cannot be used as a source of sufficient energy to produce runner vane operation without, at least, greatly reducing the sensitivity of such means which is highly undesirable. The runner vanes must accordingly be adjusted by a servomotor controlled by the operating condition responsive means. Electrically operated motors have been used in practice as vane operating servomotors but such electric motors require somewhat complicated electrical and mechanical control means. Fluid pressure operated servomotors using the oil pressure system employed for lubrication and other purposes in connection with the operation of hydraulic turbines, have likewise been used. Such oil pressure operated systems however, generally require that the oil conduit be brought up above the top of the generator or other energy translating device driven by the turbine, thus complicating the construction of such device. Even when the oil conduit and the control means therefor are kept away from the energy translating device, it is necessary to provide fluid pressure return conduits from the servomotor and to provide storage means for the oil with pressure relief devices and other safety devices usual in a pressure supply system. A large number of packings and sealing glands must be provided to prevent contamination of the oil and leakage of the oil from the pressure system. If water pressure operated means are employed in place of the oil pressure operated devices, the water can be discharged directly into the draft tube thus eliminating the necessity for return lines to a reservoir. The servomotor can be placed closely adjacent the runner vanes and can be so arranged as to be accessible without disturbance of any other portions of the superimposed turbine structure. A simple centrifugal pump without relief devices or other special control means can be employed to produce the water pressure and a simple single pilot valve can be used to control the runner vane operating servomotor thus eliminating all electrical connection. The pilot valve controlling the flow through the servomotor may be operated directly from means responsive to an operating condition of the turbine, such as the control mechanism for the guide vanes, or the valve may be operated by an auxiliary servomotor controlled responsive to such operating condition independently of or in the absence of such control mechanism.

It is therefore an object of the present invention to provide a hydraulic turbine of the adjustable vane runner type in which the fluid pressure operated means for adjusting such runner vanes is fully contained in or is immediately adjacent the turbine structure itself without any connection with or interference of any character with the energy translating device driven by the turbine.

Another object of the invention is to provide a hydraulic turbine of the adjustable vane runner type in which the fluid operated means for adjusting the runner vanes discharges directly into the draft tube of the turbine and hence does not require return of the operating fluid to a reservoir.

Another object of the invention is to provide a hydraulic turbine of the adjustable vane runner type in which the fluid pressure operated means for adjusting the runner vanes is located immediately adjacent such vanes and is accessible without disturbance of other superimposed portions of the turbine.

Another object of the invention is to provide an adjustable vane runner turbine structure in which a fluid pressure operated servomotor for operating the runner vane is controlled responsive to an operating condition of another portion of the turbine structure.

Another object of the invention is to provide a hydraulic turbine construction of the adjustable vane runner type in which a variable predetermined relation is maintained between the runner vanes of the turbine and the guide vanes of such turbine.

Objects and advantages other than those above set forth will be apparent from the following description when read in connection with the accompanying drawings in which:

Fig. 1 is a view, partially in vertical section and partially in elevation, of a hydraulic turbine construction of the adjustable vane runner type provided with a vane adjusting mechanism embodying the present invention;

Fig. 2 is an enlarged fragmentary view, again partially in vertical section and partially in elevation, of the upper portion of the structure shown in Fig. 1 and is taken at 90° relative to the position shown in Fig. 1;

Fig. 3 is a partial plan and partial sectional view taken on the broken plane III—III of Fig. 1 to illustrate the gate vane shifting mechanism and the interconnection therewith of the pilot valve of the runner vane operating mechanism;

Fig. 4 is a horizontal sectional view taken on the plane IV—IV of Fig. 1 to illustrate the manner of supporting the runner vanes in the turbine shaft structure;

Fig. 5 is an enlarged detailed view, taken on the plane V—V of Fig. 1, to illustrate one manner of connecting the runner vanes with the operating mechanism therefor;

Fig. 6 is a view taken on the broken plane VI—VI of Fig. 1 to illustrate the location and direction of apertures into the hollow shaft of the turbine for the purpose of supplying water under pressure to the operating means for the runner vanes;

Fig. 7 is a detailed view showing a portion of the runner vane operating mechanism in elevation;

Fig. 8 is a view similar to Fig. 7 but showing the detail of the inner end of one of the runner vanes;

Fig. 9 is an elevation of a portion of the gate vane shifting ring showing the operating construction mounted on such ring for controlling the movement of the pilot valve of the runner vane servomotor; and Fig. 10 is a view partially in elevation and partially in section illustrating one means for controlling the adjustment of the runner vanes of a turbine responsive directly to speed variations thereof.

Referring more specifically to the drawings by characters of reference, the reference numeral 11 designates a concrete structure forming the setting for metal foundation rings 12 and 13 which are connected with or form portions of the usual spiral casing (not shown) by which water is supplied to a turbine to be hereinafter described. The foundation rings 12 and 13 are provided with the usual braces or stay vanes 14 and the lower foundation ring 12 carries a guide vane ring 16 which is connected with a discharge ring 17 attached to a draft tube 18. The upper foundation ring 13 has attached thereto an annular cover plate 19 through which extend the spindles 21 on which are severally mounted the guide vanes 22 for oscillation into or out of engagement with each other to form a register gate to shut off or to guide the flow of water passing therethrough. The gate vane spindles 21 are connected with and rotated by a ring 23 which is mounted on the cover plate 19 and which is oscillated thereon by a plurality of servomotors 24, 26 operated by fluid pressure under control of the speed governor of the turbine as is well known and therefore not shown herein. The servomotors are separately connected with the gate vane shifting ring 23 by push rods 27 and 28 shown or by any other suitable connection. The aperture through the center of the cover plate 19 is substantially closed by a member 31 substantially in the form of a hollow truncated cone with the larger base thereof attached to the cover plate and extending downwardly inside the circle defined by the gate vanes 22. The inside of the cover cone 31 is provided with an internal partition member 32 forming a substantially cylindrical channel 33 and forming a seat for a bearing housing 34 which contains a segmental bearing 36 adjustable by means of wedges 37. The bearing 36 forms one support for a hollow shaft 41 provided with one or more apertures 42 connecting the channel 33 with the interior of the shaft at such angles as to allow for the entering of fluid under pressure from the channel into the interior of the shaft substantially without shock thereto.

The cover cone 31 has mounted on its larger base a hollow truncated cone member 43 which surrounds the shaft 41 within the shifting ring 23 to form a support for a substantially cylindrical member 44 forming a guide for a ring 46 which is movable axially of the shaft 41 within the cylinder 44. The shaft 41, at its upper end, has secured thereto an intermediate shaft member 47 which joins the turbine shaft 41 with the shaft 48 of the energy translating device driven by the turbine. The shaft connecting member 47 is hollow and is slotted and forms a steadying or guiding means for a rod 51 extending through the axial bore of the turbine shaft 41 and axially movable therein. The rod 51 forms the stem of the valve 52, the purpose of which is to control flow of fluid pressure to a runner vane operating servomotor. The valve stem 51 has a cross head 53 attached to the upper end thereof, with the ends of the cross head extending through slots in the shaft connecting member 47 and being provided with bearing shoes 54 at the ends thereof. The shoes 54 run in the ring 46 which is movable only axially of the shaft and thus forms a raceway for the bearing shoes 54 while the valve stem, the cross head and the shoes are rotated by the shaft. The raceway 46 is supported (as shown in Fig. 2) by rods 56 extending downwardly from the raceway and guided in bosses 57 on the cylinder 44. The rods 56 are linkedly connected with a yoke 58 which is pivotally mounted in the supporting cone 43 and extends therefrom. The outer end of the yoke 58 is provided with a roller 62 which contacts with cam surfaces of bars 63 mounted on brackets 64 extending from the shifting ring 23. As the shifting ring is moved responsive to actuation of the governor of the turbine as is well known, the cam bars are shifted and the yoke is tilted dependent on the curvature of the cam surfaces thus raising and lowering the raceway 46 and the valve 52. It will be understood, of course, that the curvature of the cam surfaces of the bars 63 may be made as desired in order that any predetermined relation may be maintained between the movement of the flow controlling vanes 22 and the runner vanes of the turbine. Such relation may of course be varied as desired merely by substituting a different set of cam bars 63 or by provision of a plurality of cam bars arranged side by side and by then providing the roller 62 with means for moving the roller in a direction radial with respect to the turbine.

A shaft extension 71 and a hub member 72 are attached to the lower end of the turbine shaft 41. The extension 71 is provided with a plurality of bosses 73 extending radially from the peripheral surface thereof to receive sockets formed in the ends of each of a plurality of runner blades or vanes 74 extending from and rotatably mounted in the hub 72. The several runner vanes 74 form the actual propeller or runner of a hydraulic turbine of the movable vane propeller type. Each of the propeller vanes 74 has formed thereon a crank 76 and the several cranks are linkedly attached to a hollow cross head member having one end 77 thereof guided in the interior of the hollow shaft extension 71. The other end 78 of the propeller vane cross head member extends into a cylinder 81 which is attached to the lower end of the hub 72 and which is closed at one end by a plate 82 forming a head for the cylinder and through which the cross head member extends in fluid tight relation. The cross head member has mounted thereon a differential piston 80 having a larger upper surface 83 and a smaller lower surface 84 which piston extends through and is guided by the lower end of the cylinder 81. The two surfaces of the piston are joined by a passageway 86, controlled by the valve 52, such valved passageway also controlling discharge of fluid pressure from the surface 83 of the piston to a housing 87 open at its lower end to provide communication with the draft tube 18 of the turbine. The valve 52 is so positioned relative to the portion corresponding to the seats of a normal valve structure, that the inflow and discharge of fluid pressure into or out of the cylinder 81 is never wholly interrupted.

When the turbine is in operation, the gate vanes 22 and the propeller vanes 74 will be in the position for the operating condition of the turbine to attain its highest power, that is in the position shown of steepest tilt of the runner vanes. The cam surfaces of the bars 63 are so designed that the valve 52 is then in the position shown that is, just off its upper seat thus keeping the fluid pressure, which is supplied through the pipe 88 connecting through the cover plate of the turbine with an external source of pressure, the channel 33, the apertures 42, the axial bore of the shaft 41 and the bore of the cross head 78; on the several piston surfaces 83 and 84 equalized. There is hence no movement of the piston and the propeller vanes 74 remain in the position shown with the piston resisting the twisting force of the water acting on such vanes. Upon the occurrence of a change in the operating condition of the turbine which produces a change in the position of the shifting ring 23 and thus causes partial closure of the gate vanes 22, the cams 63 are adjusted to rock the yoke 58 and to lower the raceway 46 an amount dependent on the curvature of the cam surfaces. The cam curvature chosen is such as to depress the stem 51 and the valve 52 at a predetermined rate against its lower seat, the valve then allowing full application of the fluid pressure above the piston surface 83 and below the piston surface 84. The piston cross head 77, 78 then moves down to rotate the runner vanes 74 to the position required by previous movement of the gate vanes 22. Such rotation of the runner vanes, of course, continues only until the cam bars 63 have moved sufficiently to cause the return of the valve 52 substantially to the position shown intermediate the upper and lower seats thereof, whereupon the pressure is again equalized on both piston surfaces due to the fact that the inflow and discharge of the fluid pressure into the cylinder are balanced. The propeller vanes 74 then remain in the position then attained. Any further shifting of the shifting ring 23 to close the gate vanes 22 farther merely causes a repetition of the above movement to a degree determined by the curvature of the cam bars 63.

When the gate vanes 22 are closed to their fullest extent, the runner vanes 74 will be in their smallest angular or flattest position. If the servomotors 24 and 26 are then operated to open the gate vanes 22, such movement of the gate vanes will raise the valve 52 to cause an increase in the discharge of the fluid from above the piston surface 83 thus allowing pressure to build up on the surface 84 which causes lifting movement of the piston 83, 84 and produces a steeper tilt of the runner vanes 74. Lifting movement of the piston also restores the valve 52 to its former intermediate position relative to the inflow and discharge ports of the piston which again causes equalization of the pressure on the piston to retain the runner vanes in their then attained position.

In the modified embodiment of the present invention illustrated in Fig. 10, the raceway 46 which adjusts the position of the pilot valve 52 is shifted responsive directly to the varying speed of operation of the turbine rather than responsive to adjustment of the position of the gate vanes 22 as was previously described. The present embodiment may accordingly be used either with or without movable gate vanes. The structure up to and including the raceway operating yoke 58 is the same as was previously described but instead of using the cam surfaces 63 operated by the shifting ring 23, the end of the yoke 58 is connected with a rod 91 connected with a piston 92 movable within a cylinder 93 arranged to be supplied with fluid pressure from a suitable source, such as the lubricating pressure supplied for the turbine, by way of an inlet 94 and an outlet 95. The piston 92 is provided with an aperture 97 connecting the two sides of the piston and is provided with an apertured hollow upward extension 98 extending through a partition 99 across the cylinder 93. The cylinder 93 is thus divided into a lower piston space, an upper piston space, and a discharge space. Flow of fluid under pressure through the inlet 94 into the cylinder 93 is controlled by the area of the aperture 97 and discharge of fluid from the cylinder 93 by way of the outlet 95 is controlled by the position of the valve 101 which varies the rate of but never wholly interrupts the discharge through the extension 98 of the piston. The valve 101 is connected with one end of a floating lever 102 which is connected, at an intermediate point thereof, with a device 103 which is responsive to the speed of the turbine and is herein shown as the usual flyball governor driven by a belt 104 from the generator shaft 48. The other end of the floating lever 102 is connected with a threaded spindle 106 by which such end of the lever may be adjusted for synchronizing purposes as is well known in the art, either by hand wheel 107 or by a remotely controllable motor 108 connected with the spindle 106 through a worm gear drive and through a suitable releasable coupling 109. As long as the speed of the turbine remains at its predetermined value, valve 101 remains in such position that discharge from the upper piston surface exactly balances the flow of fluid through the aperture 97 from the lower piston space. The pressure on the two sides of the piston 92 is therefore balanced and the raceway 46 remains stationary thus retaining the pilot valve 52 in the position shown in Fig. 1. When speed variations occur, the floating lever is lifted or depressed dependent on the sense of the speed change and valve 101 is moved away from or toward the extension 98 of the servomotor piston thus increasing or decreasing the rate of fluid discharged from the upper piston space and thus causing the piston to raise or lower the raceway 46 and causing the pilot valve 52 to operate the runner vanes as previously described.

It will be apparent from the above that the present invention provides a solution of the problem of varying the tilt of runner vanes of hydraulic turbines of the adjustable vane type while such turbines are in operation and that such solution allows for maintaining the requisite relation between the position of the gate and the runner vanes when such relation is desired. The energy required for shifting the runner vane is obtained from a differential piston fluid operated servomotor which is located below and immediately adjacent the runner vane. The servomotor is operated by water under pressure which is supplied directly through the cover plate structure of the turbine and is discharged directly into the draft tube thus greatly reducing the piping required and eliminating the need for packing glands and pipe joints in the pressure system such as were heretofore required. No valves of any character are required in the water supply line and the single valve controlling the discharge of the water from the servomotors is solely contained within and is a part of the structure of the turbine itself. Due to the use of water as the pressure fluid, an ordinary centrifugal pump may be used and may be connected with any suitable source of water, without requiring unloaders, relief valves and other safety devices heretofore demanded in such pressure systems. The entire mechanism may be removed or repaired without in any way disturbing the generator and the servomotor may be removed or repaired without dismounting of even the runner vanes of the turbine.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a hydraulic turbine, a shaft having an axial bore therethrough, a hub suspended from said shaft, a plurality of vanes extending from and rotatably mounted in said hub, a casing supporting said shaft and guiding the flow of water to said vanes, a plurality of vanes mounted in said casing for movement into position controlling the flow of water therethrough, a fluid pressure operated servomotor located within said hub and operable to rotate said hub mounted vanes, a conduit partially formed by said casing for supplying fluid pressure to the bore in said shaft to operate said servomotor, a valve associated with said servomotor for controlling application of fluid pressure thereto, the stem of said valve extending through the bore in said shaft, the movements of said piston and of said valve complementing each other to retain said vanes in the position reached after movement thereof, and means interconnecting said flow controlling vanes with said valve for simultaneous operation thereof.

2. In a hydraulic turbine, a shaft having an axial bore therethrough, a hub suspended from said shaft, a plurality of vanes extending from and rotatably mounted in said hub, a casing supporting said shaft and guiding the flow of water to said vanes, a plurality of vanes mounted in said casing for movement into position controlling the flow of water therethrough, a fluid pressure operated servomotor located within said hub and operable to rotate said hub mounted vanes, a conduit partially formed by said casing for supplying fluid pressure to the bore in said shaft to operate said servomotor, a valve associated with said servomotor for controlling application of fluid pressure thereto, the stem of said valve extending through the bore in said shaft, the movements of said piston and of said valve complementing each other to retain said vanes in the position reached after movement thereof, means for operating said flow controlling vanes dependent on an operating condition of the turbine, and means for operating said valve from said vane operating means at a predetermined rate of movement.

3. In a hydraulic turbine, a shaft having an axial bore therethrough, a hub suspended from said shaft, a plurality of vanes extending from and rotatably mounted in said hub, a casing supporting said shaft and guiding the flow of water to said vanes, a plurality of vanes mounted in said casing for movement into position controlling the flow of water therethrough, a fluid pressure operated servomotor connected with said hub and operable to rotate said hub mounted vanes, a conduit partially formed by said casing for supplying fluid pressure to the bore in said shaft to operate said servomotor, a valve associated with said servomotor for controlling application of fluid pressure thereto, the stem of said valve extending through the bore in said shaft, cam means connected with said vane operating means for movement thereby, and means operated by said cam means for actuating said valve.

4. In a hydraulic turbine, a shaft having an axial bore therethrough, a hub suspended from said shaft, a plurality of vanes extending from and rotatably mounted in said hub, means movable into position to control the flow of water through the turbine, a fluid pressure operated servomotor located within said hub and operable to rotate said vanes, a conduit for supplying fluid pressure to the bore in said shaft for supply to said servomotor, a valve for controlling application of fluid pressure to said servomotor, said piston and said valve coacting in their movements to restore pressure equilibrium of said piston to retain said vanes in the position reached after movement thereby, means for operating said flow controlling means dependent on an operating condition of the turbine, and means for controlling the movement of said valve by said vane operating means to a predetermined rate.

5. In a hydraulic turbine, a shaft having an axial bore therethrough, a hub suspended from said shaft, a plurality of vanes extending from and rotatably mounted in said hub, means movable into position to control the flow of water through the turbine, a fluid pressure operated servomotor located within said hub and operable to rotate said vanes, a conduit for supplying fluid pressure to the bore in said shaft for supply to said servomotor, a valve for controlling application of fluid pressure to said servomotor, the movements of said piston and of said valve complementing each other to retain said vanes in the position reached after movement thereof, means for operating said flow controlling means dependent on an operating condition of the turbine, cam means connected with said flow controlling means for movement thereby, and means operated by said cam means for actuating said valve.

6. A hydraulic turbine comprising a casing, a hollow shaft journaled in said casing, a runner hub mounted on said shaft, a plurality of runner vanes separately and rotatably mounted in said hub, means connected with all of said vanes in such manner as to operate all of said vanes simultaneously, a cylinder carried by said hub on the discharge side of said runner vanes, a differential piston in said cylinder to actuate said vane operating means, means for conducting fluid under pressure from said hollow shaft to one side of said piston, and means including a single valve for controlling the flow of fluid to the other side of said piston and for controlling the discharge of fluid from said cylinder, said piston and said valve coacting in their movements to restore pressure equilibrium on said piston to retain said vanes in the position reached after movement thereby.

7. Vane operating means for a hydraulic turbine of the adjustable runner vane type, comprising a cylinder attached to the discharge end of the turbine runner hub, a differential piston operatively mounted in said cylinder, means operatively connecting said piston to the adjustable runner vanes, means for applying water under pressure to one side of said piston, a pilot valve associated with said piston and arranged to control the flow of water from one side of said piston to the other side thereof and to control the escape of water from said cylinder, said piston and said valves cooperating to provide balanced pressures on both sides of said piston after each movement of said vanes in either direction of rotation, and means for adjusting the position of said valve dependent on an operating condition of the turbine to thereby control the position of said piston and the angular positioning of the runner vanes.

8. In a hydraulic turbine, a shaft having an axial bore therethrough, a casing supporting said shaft and providing a channel for the supply only of fluid pressure to the lower portion of the bore in said shaft, a hub mounted on said shaft and forming a cylinder, a plurality of vanes extending from and rotatably mounted in said hub, a piston located within the cylinder in said hub and operable by fluid pressure to rotate said vanes, a valve controlling the application of fluid pressure to and the discharge of fluid pressure from the portions of said cylinder on opposite sides of said piston, the stem of said valve extending through the bore in said shaft, the movements of said piston and of said valve complementing each other to retain said vanes in the position reached after movement thereof, a housing arranged about an upper portion of said shaft, means movable within said housing for actuating said valve, and means responsive to an operating condition of the turbine for operating said valve actuating means.

9. In a hydraulic turbine, a shaft having an axial bore therethrough, a casing supporting said shaft and providing a channel for the supply only of fluid pressure to the lower portion of the bore in said shaft, a hub mounted on said shaft and forming a cylinder, a plurality of vanes extending from and rotatably mounted in said hub, a piston located within the cylinder in said hub and operable by fluid pressure to rotate said vanes, a valve controlling the application of fluid pressure to and the discharge of fluid pressure from the portions of said cylinder on opposite sides of said piston, the stem of said valve extending through the bore in said shaft, the movements of said piston and of said valve complementing each other to retain said vanes in the position reached after movement thereof, a housing arranged about an upper portion of said shaft, a raceway movable within said housing, shoes mounted on the stem of said valve and resting on said raceway, and means responsive to an operating condition of the turbine for actuating said raceway.

10. In a hydraulic turbine, a shaft having an axial bore therethrough, a casing supporting said shaft and providing a channel for the supply only of fluid pressure to the lower portion of the bore in said shaft, a hub mounted on said shaft and forming a cylinder, a plurality of vanes extending from and rotatably mounted in said hub, a piston located within the cylinder in said hub and operable by fluid pressure to rotate said vanes, a valve controlling the application of fluid pressure to and the discharge of fluid pressure from the portions of said cylinder on opposite sides of said piston, the stem of said valve extending through the bore in said shaft, said piston and said valve coacting in their movements to restore pressure equilibrium on said piston to retain said vanes in the position reached after movement thereby, a housing arranged about an upper portion of said shaft, a raceway movable within said housing, shoes mounted on the stem of said valve and resting on said raceway, vanes mounted in said casing for controlling the flow of water therethrough, means for operating said control valves responsive to an operating condition of the turbine, and means connecting said control vane operating means with and actuating said raceway to cause movement of said shoes.

11. In a hydraulic turbine, a shaft having an axial bore therethrough, a casing supporting said shaft and providing a channel for the supply only of fluid pressure to the lower portion of the bore in said shaft, a hub mounted on said shaft and forming a cylinder, a plurality of vanes extending from and rotatably mounted in said hub, a piston located within the cylinder in said hub and operable by fluid pressure to rotate said vanes, a valve controlling the application of fluid pressure to and the discharge of fluid pressure from the portions of said cylinder on opposite sides of said piston, the stem of said valve extending through the bore in said shaft, said piston and said valve coacting in their movements to restore pressure equilibrium on said piston to retain said vanes in the position reached after movement thereby, a housing arranged about an upper portion of said shaft, a raceway movable within said housing, shoes mounted on the stem of said valve and resting on said raceway, vanes mounted in said casing for controlling the flow of water therethrough, means for operating said control vanes responsive to an operating condition of the turbine, cam means mounted on and operable by said control valve operating means, and means operated by said cam means for actuating said raceway to cause movement of said shoes.

12. In a hydraulic turbine, a shaft having an axial bore therethrough, a casing supporting said shaft and providing a channel for the supply only of fluid pressure to the lower portion of the bore in said shaft, a hub mounted on said shaft and forming a cylinder, a plurality of vanes extending from and rotatably mounted in said hub, a piston located within the cylinder in said hub and operable by fluid pressure to rotate said vanes, a valve controlling the application of fluid pressure to and the discharge of fluid pressure from the portions of said cylinder on opposite sides of said piston, the stem of said valve extending through the bore in said shaft, said piston and said valve cooperating to provide balanced pressures on both sides of said piston after each movement of said vanes in either direction of rotation, a housing arranged about an upper portion of said shaft, a raceway movable within said housing, shoes mounted on the stem of said valve and resting on said raceway, vanes mounted in said casing for controlling the flow of water therethrough, means for operating said control vanes responsive to an operating condition of the turbine, cam means mounted on and operable by said control vane operating means, a lever pivotally mounted on said housing and actuated by said cam means, and a linkage connecting said raceway with said lever for movement thereby upon movement of said cam means.

13. In a hydraulic turbine, a shaft having an axial bore therethrough, a casing supporting said shaft and providing a channel for the supply only of fluid pressure to the lower portion of the bore in said shaft, a hub mounted on said shaft and forming a cylinder, a plurality of vanes extending from and rotatably mounted in said hub, a piston located within the cylinder in said hub and operable by fluid pressure to rotate said vanes, a valve controlling the application of fluid pressure to and the discharge of fluid pressure from the portions of said cylinder on opposite sides of said piston, the stem of said valve extending through the bore in said shaft, said piston and said valve cooperating to provide balanced pressures on both sides of said piston after each movement of said vanes in either direction of rotation, a housing arranged about an upper portion of said shaft, a raceway movable within said housing, shoes mounted on the stem of said valve and resting on said raceway, and a fluid pressure operated servomotor controlled responsive to an operating condition of the turbine for actuating said raceway.

14. In a hydraulic turbine, a shaft having an axial bore therethrough, a casing supporting said shaft and providing a channel for the supply only of fluid pressure to the lower portion of the bore in said shaft, a hub mounted on said shaft and forming a cylinder, a plurality of vanes extending from and rotatably mounted in said hub, a piston located within the cylinder in said hub and operable by fluid pressure to rotate said vanes, a valve controlling the application of fluid pressure to and the discharge of fluid pressure from the portions of said cylinder on opposite sides of said piston, the stem of said valve extending through the bore in said shaft, said piston and said valve cooperating to provide balanced pressures on both sides of said piston after each movement of said vanes in either direction of rotation, a housing arranged about an upper portion of said shaft, a raceway movable within said housing, shoes mounted on the stem of said valve and resting on said raceway, a fluid pressure operated servomotor for actuating said raceway, and a valve actuated responsive to an operating condition of the turbine for controlling the action of fluid pressure within said servomotor.

ARNOLD PFAU.